United States Patent [19]

Scott

[11] Patent Number: 4,609,220

[45] Date of Patent: Sep. 2, 1986

[54] ARTIFICIAL HAND DEVICE

[75] Inventor: Peter B. Scott, Osterley Village, England

[73] Assignee: National Research Development Corporation, London, England

[21] Appl. No.: 648,968

[22] Filed: Sep. 10, 1984

[30] Foreign Application Priority Data

Sep. 12, 1983 [GB] United Kingdom ............... 8324368

[51] Int. Cl.⁴ ............................................. B65G 47/26
[52] U.S. Cl. .................................... 294/87.1; 294/86.4
[58] Field of Search .................... 294/86.4, 87.1, 106, 294/119.3, 98.1, 907; 414/730, 735; 901/30, 39, 33; 3/12.7, 12.6, 12.8

[56] References Cited

U.S. PATENT DOCUMENTS

| | | | |
|---|---|---|---|
| 2,873,996 | 2/1959 | McHugh, Jr. | 294/64 |
| 3,347,587 | 10/1967 | Frost | 294/87.1 |
| 3,507,404 | 4/1970 | Pompe | 294/87.1 |
| 3,753,589 | 8/1973 | Hahn | 294/87.1 |
| 4,367,891 | 1/1983 | Wauer et al. | 294/88 |

FOREIGN PATENT DOCUMENTS

| | | |
|---|---|---|
| 2823584 | 6/1979 | Fed. Rep. of Germany . |
| 2392781 | 5/1977 | France . |
| 1227530 | 4/1971 | United Kingdom . |
| 1385154 | 2/1972 | United Kingdom . |
| 1332796 | 10/1973 | United Kingdom . |
| 2017557 | 10/1979 | United Kingdom . |

OTHER PUBLICATIONS

Patent Abstracts of Japan—M section, vol. 1, No. 14, Mar. 22, 1977—p. 1099 M 76.

Primary Examiner—James B. Marbert
Attorney, Agent, or Firm—William R. Hinds

[57] ABSTRACT

An artificial hand device, particularly for use in robotics, comprises an assembly of substantially parallel pins mounted on a carrier so that the free ends of pins pressed against a given object may move axially to conform to the profile of the object. Means to move lateral surfaces of the pins laterally allows the device to grip the object. Means to detect pin position allows sensing of the shape of the object.

5 Claims, 6 Drawing Figures

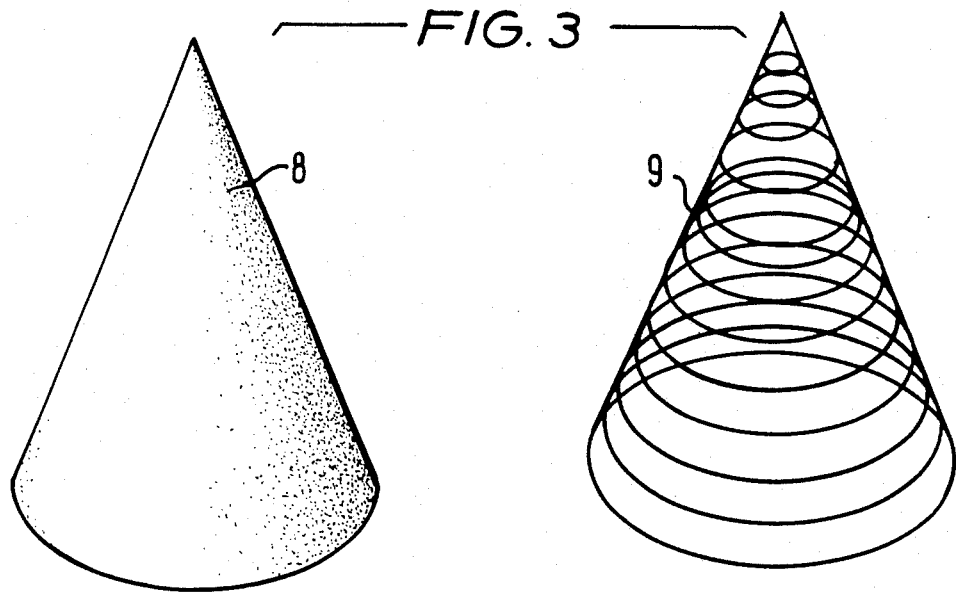
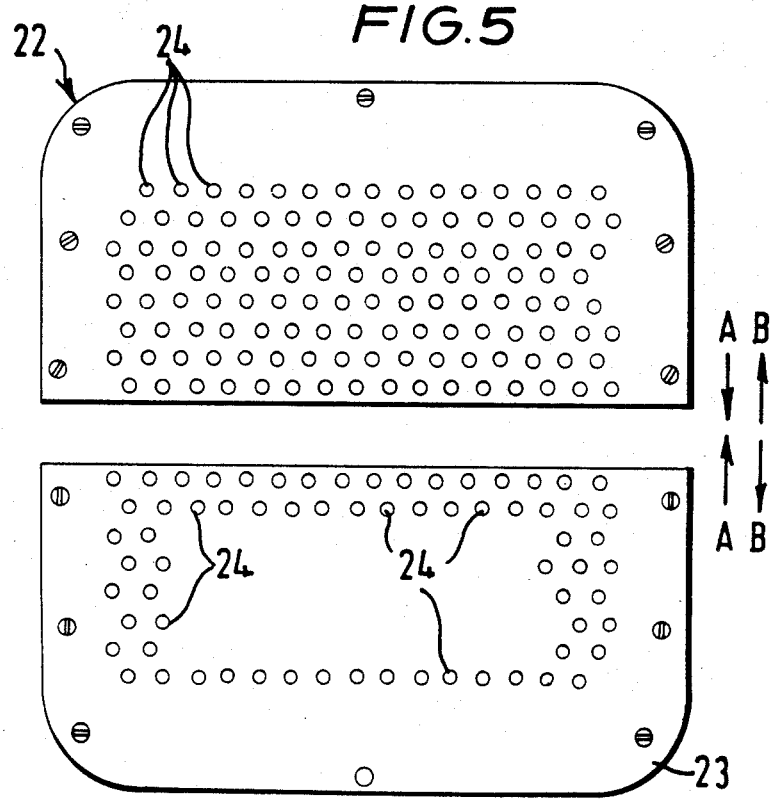

ARTIFICIAL HAND DEVICE

This invention relates to an artificial hand device which allows objects to be gripped and/or their shape to be determined. The invention is particularly useful in the field of robotics for tasks such as assembly, but is not restricted to this.

Robot-gripper design for the handling of a given workpiece is difficult enough, but as the number of different parts to be handled increases, so too do the often conflicting design requirements. Although robotic fingers can be designed to hold different sizes of object at different points along their length, in many cases such an approach is not feasible. As a result, some robots use a double gripper consisting of two independent grippers on the one robot wrist. By rotating the wrist, either gripper can be brought into position so that, for instance, one gripper might be used to place a part into a machine tool but the other gripper used to subsequently remove the part, by then of different shape.

Such systems are satisfactory when only two different shapes are to be handled, but when several variously shaped objects are present, a change-over system is often employed. These systems automatically replace either part or all of the gripper for another. This may be accomplished by attaching different grippers to a 'stub' on the robot wrist, or else one gripper may remain permanently attached and be used to 'pick up' the alternative grippers. Although expensive to design, build, maintain and programme, change-over systems may be suitable if the robot can accomplish the exchange during a period in which it would otherwise be idle. Unfortunately, however, in tasks such as assembly, which is destined to be a very major application for the new 'generation' of robots, the robot tends to 'pace' the whole system it is working with; any time spent other than actually assembling is time wasted which is immediately reflected in an increased final cost of assembly.

In such circumstances, some form of 'universal' gripper is required which can pick up a wide variety of different parts. Various such form-adaptable grippers have been developed in research laboratories. A common approach is to employ three or more (often independently controlled) jointed fingers, analogous to a human hand, but unfortunately, the control problems of such systems are a long way from being solved.

A passive approach to form-adapting uses a conventional gripper that has fingers padded with a loose lining filled with granular powder. When an object is gripped, the padding moulds around the object surface and is then 'fixed' prior to moving the gripper by locking all the granules together. This may be accomplished either by electro-magnetising granules of iron, or by applying a vacuum to the filling. However, with both this passive approach and with the anthropomorphic hand, it is difficult to sense, let alone predict, where exactly a grasped object is relative to the robot wrist.

A known form of robotic-sensor comprises an assembly of rods, each of which pass through a coil, the inductance of which is measured. As such an assembly of rods comes down on to an object each rod will be moved on touching the object and by measuring the inductance of the coils it is possible to determine the position of each rod, and thereby the shape of the object.

The inventor has devised an artificial hand device which provides a new form of robotic-gripper and robotic-sensor.

This invention provides an artificial hand device comprising an assembly of substantially parallel pins mounted to be capable of axial movement, to conform to the profile of an object against which free ends of the pins are pressed, and of gripping the object sideways, the pins being mounted in two or more laterally movable carriers as a multiple row matrix, lateral surfaces of the pins being movable laterally to grip an object frictionally by lateral carrier movement.

The invention also provides an artificial hand device comprising an assembly of substantially parallel pins mounted on a carrier, so that free ends of pins pressed against a given object may move axially to conform to the profile of the object, means being provided to move pin lateral surfaces adjacent to the object laterally to grip the object, pin movement sensors being provided to enable the profile of an object against which free ends of pins are pressed to be determined.

Further aspects of the invention are set out by the accompanying claims and are illustrated by way of example in the following description of two embodiments of the invention with reference to the drawings in which:

FIG. 3 illustrates diagrammatically how an artificial hand device according to the invention can form an image of an object;

FIG. 5 is a plan view of a pair of carrier plates for the pins of FIG. 4;

Figure 1:
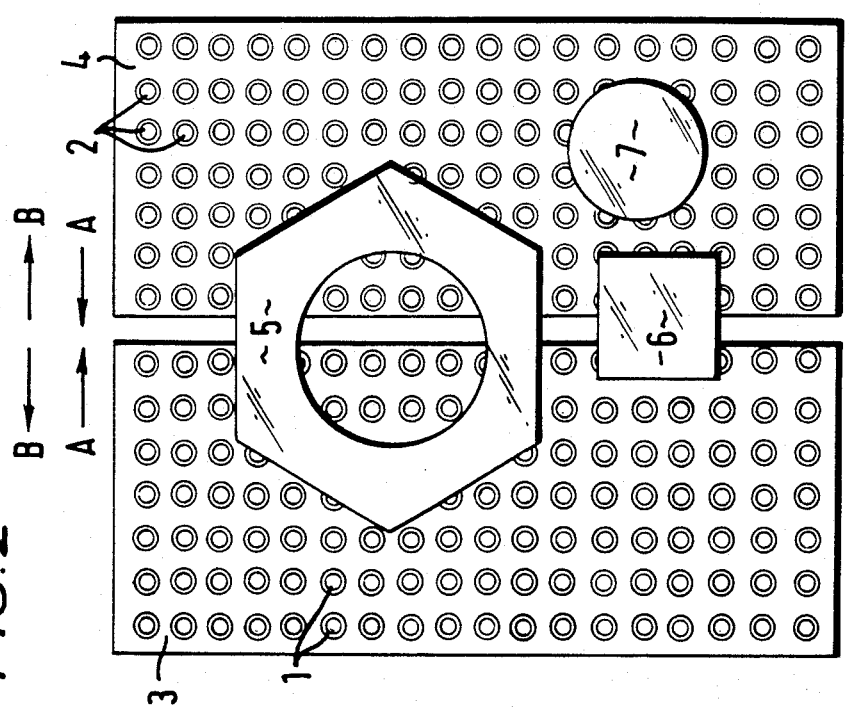
FIG. 1 is a schematic sectional elevation showing an object to be picked up and part of an artificial hand device according to one aspect of the invention.
Figure 2:
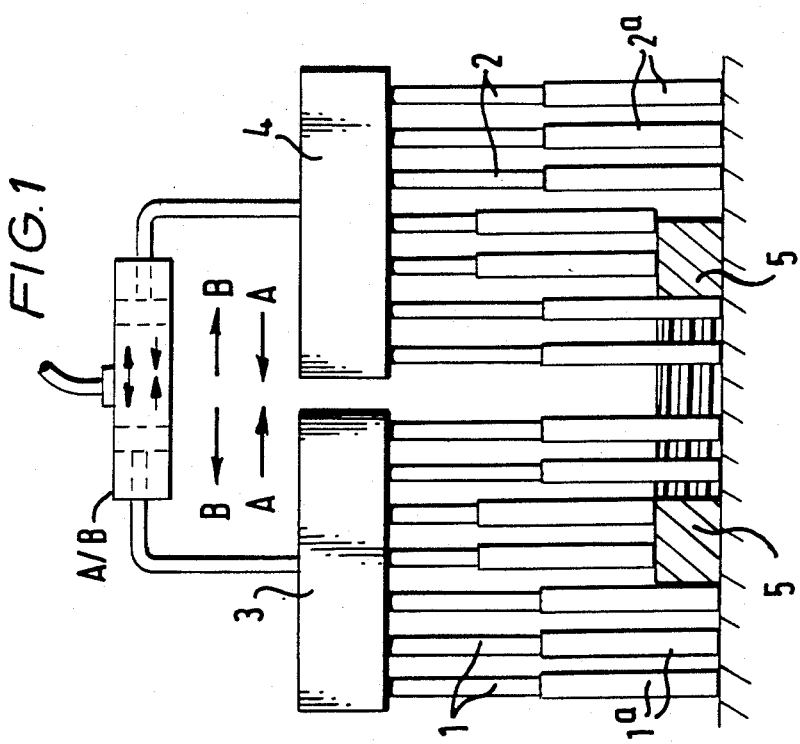
FIG. 2 is a schematic bottom plan showing three objects and part of the artificial hand of FIG. 1.

FIGS. 1 and 2 show two sets of pins, 1, 2 supported by carriers 3, 4 and having telescopic free ends 1a, 2a movable axially relatively to the carrier. An object 5 to be picked up is shown on a level surface (FIG. 1 only). Pins whose free ends have contacted the surface of the object 5 have ridden up and conform to the surface of the object 5. To lift the object 5 the carriers 3, 4 can be moved together (A—A) to grip externally by friction against the lateral surfaces of the pins, or moved apart (B—B) to grip internally. Suitable means for moving the carriers include pneumatic activators as indicated diagrammatically at A/B. Suitable pneumatic or other activators, for example solenoids, are commercially available.

FIG. 2 makes it clear that only an object transversing both sets of pins 1, 2 may be gripped by this artificial hand device. Object 6 may be gripped externally only; object 5 may be gripped internally or externally; object 7 will not be gripped but merely moved by the artificial hand device. Thus this form of artificial hand device allows selection between objects by suitable positioning of the hand device, and if necessary repeated cycles of selection of one or more objects from a larger number.

By sensing the position of the pins 1, 2 it is possible to determine the profile of an object 5 against which it is pressed, or indeed of several objects against which it is pressed. This determination of the profile of an object may be done by either continuously sensing the position of the pins 1, 2 or by sensing the position of the artificial hand device at which a pin first moves. This latter method is illustrated by FIG. 3 which shows a cone object 8. At a series of positions along the cone axis the distribution of those pins which have been moved from a datum position is noted to represent a section of the cone 8. By successively moving the artificial hand device along the cone axis a series of sections of the object can be determined and by correlating these sections with the distance moved by the artificial hand device a profile of the cone may be built up as shown at 9. The procedure can readily be performed by a microprocessor which records at regular intervals the coordinates of those pins lifted from a datum position, the artificial hand device travelling along the pin axis direction at a known rate. By correlating pin coordinates, time of lifting of pins, and velocity of movement of the artificial hand device along the pin axis direction a profile of an object may be built up in the microprocessor memory for subsequent processing.

Other methods of determining the profile of an object may be readily envisaged and the present invention is not restricted in scope by the method used. For example correlation may be made between the distribution of pins lifted and the position along the pin axis direction of the artificial hand device as determined by the control mechanism of the artificial hand.

Figure 4:
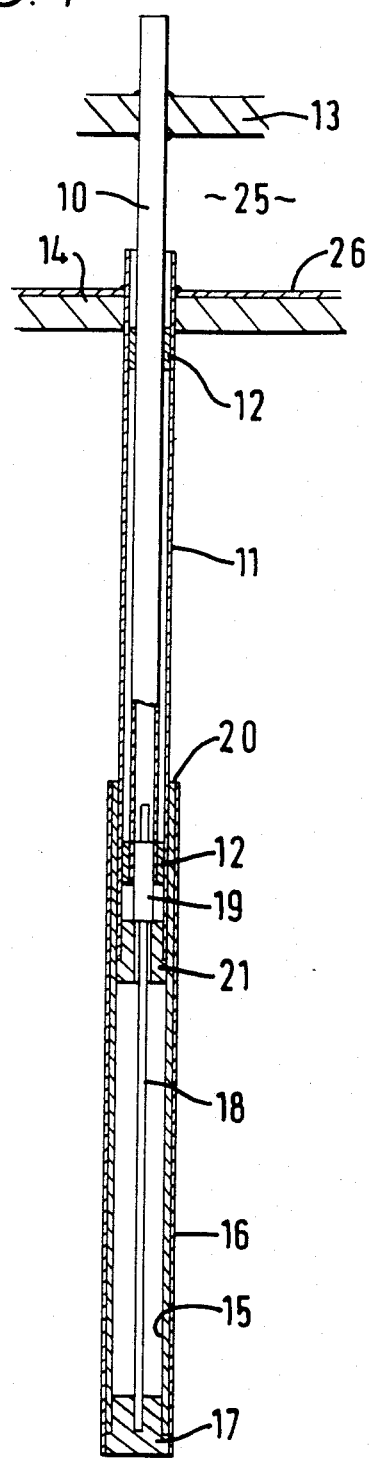
FIG. 4 is a sectional elevation of a pin forming part of the artificial hand of FIG. 1.

FIG. 4 shows a suitable form of pin for the present invention together with parts of carrier plates to be described below. The pin comprises inner and outer stainless steel electrical conductor tubes 10, 11 insulated from each other by plastics sheathing 12. The inner conductor tube 10 is supported by carrier 13 and the outer conductor tube 11 is supported by carrier 14. The moving part of the pin comprises a stainless steel sleeve 15 which is a sliding fit over the outer conductor tube 11. The sleeve 15 is covered by a plastics sheath 16 to give a better grip on objects to be handled. In the end of the sleeve 15 remote from the carrier 14 is a nylon bush 17 which carries a stainless steel rod 18 at its end, the rod passing back through the sleeve 15 and into the inner conductor tube 10. At the free end of the rod 18 is a contact slider 19 which is a close sliding fit in the inner conductor tube 10. The sleeve 15 is free to move along the axis of the outer conductor tube 11 between two extremes of movement. The first extreme is where the open end 20 of the sleeve meets the carrier 14, the second extreme is when the contact slider 19 meets an annular conducting end stop 21 which is fixed in the end of the outer conductor tube 11, and through which the rod 18 passes without touching. It can be seen that when the sleeve is at its second extreme, i.e. furthermost from the carrier 14, electrical contact may be made between inner conductor tube 10 and outer conductor tube 11 through the contact slider 19 and end stop 21. As soon as the sleeve moves from this extreme position the electrical contact is broken, contact slider 19 moving away from end stop 21. The contact slider 19 and end stop 21 thus form a switch which is closed when the sleeve is in its second extreme position. Thus the second extreme position of the sleeve 15 can be used as a datum point for sensing contact with an object. To assist in the sleeve 15 returning to its datum point on moving away from an object air pressure may be applied via the inner conductor tube 10. An air pressure of 0–3 pounds per square inch should be adequate and this may be applied either continuously or as required. Other return mechanisms e.g. springs, may readily be envisaged.

The form of the carriers 14, 15 is illustrated in FIG. 5 in which two half plates 22, 23 are shown each having a matrix of holes 24 (not all shown) in its surface to accept either an inner or outer conductor tune 10, 11 (not shown). Gripping action of the artificial hand device is by movement of these half plates 22, 23 either inwards (A—A) for an external grip or outwards (B—B) for an internal grip. As previously stated such movement may be controlled either by a pneumatic activator or solenoid. For example, it may be by release of air pressure to a pneumatic actuator holding the half plates open against a spring.

In FIG. 4 a space 25 is shown between carriers 13 and 14. This space may be used for wiring connections to the inner conductor tubes 10, the outer conductor tubes 11 having a common electrical supply 26 either by solder or printed circuit. Alternatively printed circuit connections may be made to both inner and outer conductor tubes 10, 11 by conductors on the carriers 13, 14 respectively.

Figure 6:
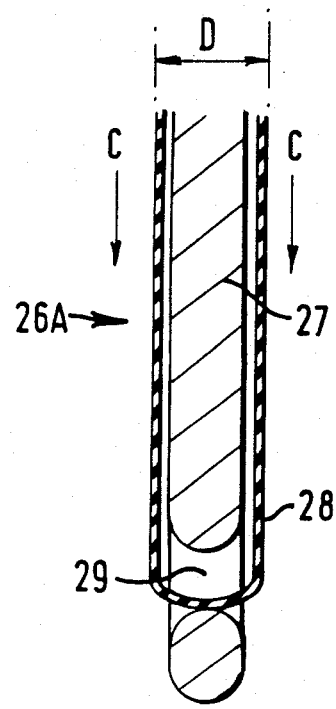
FIG. 6 is a sectional view of a pin from an artificial hand device according to a different embodiment of the invention.

FIG. 6 shows an alternative form of pin 26A for an artificial hand device according to the invention. In this aspect of the invention rather than obtaining lateral movement of the pin surfaces adjacent an object by moving two sets of pins, movement is obtained by expanding the pins. In FIG. 6 a needle shaped rod 27 has a flexible band 28 passing through its eye 29 to form a loop. It can be seen that movement of the band 28 along direction C will cause the sides of the band to bulge and thus cause the overall width D of the loop to increase and thereby increase the effective diameter of the pin 26A. It is clear that an assembly of such pins will grip an object anywhere on its surface provided at least two opposite sides of the object in the plane of the assembly are encompassed by the assembly. Such pins of course will only grip in the direction of loop expansion; to obtain an all round lateral grip an alternative is to provide a pin with a flexible rubber-like covering which may be expanded by air pressure.

If all the pins are caused to expand it can be seen that the selectivity of the previously described artificial hand device will be lost. Improved selectivity may be gained however if individual pins can be expanded leaving others unexpanded.

It should be noted that for both embodiments described the pins should be reasonably stiff, but absolute rigidity is not required. The main requirements for stiffness are that the pin be sufficiently rigid to grip, and that it should be free to move to its datum position on releasing a gripped object.

I claim:

1. An artificial hand device comprising an assembly of substantially parallel pins mounted to be capable of axial movement, to conform to the profile of an object against which free ends of the pins are pressed, and of gripping the object sideways, the pins being mounted in two or more laterally movable carriers as a multiple row matrix, lateral surfaces of the pins being movable laterally to grip an object frictionally by lateral carrier movement.

2. An artificial hand device as claimed in claim 1, in which pin movement sensor means are provided to enable the profile of an object against which free ends of pins are pressed to be determined.

3. An artificial hand device as claimed in claim 2, in which the pin movement sensor means are switches;

switches for individual pins being in a first state when the pin is at a datum position, and in a second state when the pin has moved from that datum position, means being provided to determine the profile of an object by correlating the distribution of switches in said first and second states with the position of the device in the direction of the pin axes.

4. An artificial hand device comprising an assembly of substantially parallel pins mounted on a carrier, so that free ends of pins pressed against a given object may move axially to conform to the profile of the object, means being provided to move pin lateral surfaces adjacent to the object laterally to grip the object, pin movement sensors being provided to enable the profile of an object against which free ends of pins are pressed to be determined.

5. An artificial hand device as claimed in claim 4, in which the pin movement sensor means are switches; switches for individual pins being in a first state when the pin is at a datum position, and in a second state when the pin has moved from that datum position, means being provided to determine the profile of an object by correlating the distribution of switches in said first and second states with the position of the device in the direction of the pin axes.

* * * * *